United States Patent [19]

Hesterman

[11] Patent Number: 5,166,869
[45] Date of Patent: Nov. 24, 1992

[54] COMPLEMENTARY ELECTRONIC POWER CONVERTER

[76] Inventor: Bryce L. Hesterman, P.O. Box 472, Orem, Utah 84059

[21] Appl. No.: 718,200

[22] Filed: Jun. 20, 1991

[51] Int. Cl.$^5$ .................... H02M 1/14; H02M 3/337
[52] U.S. Cl. ........................................ 363/25; 363/24; 363/45
[58] Field of Search ................... 363/15-26, 363/45, 46

[56] References Cited

U.S. PATENT DOCUMENTS

| | | | |
|---|---|---|---|
| 4,257,087 | 3/1981 | Cuk | 363/16 |
| 4,274,133 | 6/1981 | Cuk et al. | 363/39 |
| 4,630,005 | 12/1986 | Clegg et al. | 331/113 A |
| 4,703,409 | 10/1987 | Spreen | 363/45 |
| 4,774,649 | 9/1988 | Archer | 363/20 |
| 4,914,561 | 4/1990 | Rice et al. | 363/26 X |
| 5,038,263 | 8/1991 | Marrero et al. | 363/20 |

OTHER PUBLICATIONS

Severns, *High Frequency Coverters with Non Pulsating Input and Output Currents*, Technical Papers of the Fifth International High Frequency Power Conversion 1990 Conference, May 6-11, 1990 (HFPC May 1990 Proceedings, pp. 223-234).

LaBelle, *Power Isolators are Bidirectional*, EDN, vol. 34, No. 12, Jun. 8, 1989, pp. 203, 205.

*Primary Examiner*—Emanuel T. Voeltz
*Attorney, Agent, or Firm*—William E. Hein

[57] ABSTRACT

Minimal energy storage is required in complementary converters, a family of zero-voltage switching circuits which achieve non-pulsating input and output currents by employing a ripple-cancelling technique instead of conventional filtering. The input voltage in these circuits is divided between a primary winding of a main transformer and a primary winding of a second transformer referred to as a complement transformer. The turns ratios of the two transformers are adjusted so that the secondary voltage of the complement transformer cancels the ripple in the rectified output of the main transformer. The symmetry of these circuits allows an AC voltage waveshape to be impressed upon the main transformer, independent of the load current passing through it. If desired, a sinusoidal voltage can be produced across the main transformer with only a small resonant current, which can be achieved with minimal energy storage. The complement transformer also requires minimal energy storage because the flux produced by the DC primary currents is cancelled by the DC secondary currents. The symmetry of these circuits allows them to have bidirectional power flow if synchronous rectification is used. Further, if bidirectional switches are used, reversing the input voltage will reverse the output voltage. Thus, complementary converters can be made to emulate an ideal transformer, passing both AC and DC if the input frequency is well below the switching frequency.

9 Claims, 7 Drawing Sheets

COMPLEMENTARY ELECTRONIC POWER CONVERTER

BACKGROUND OF THE INVENTION

This invention primarily relates to the field of fixed-ratio DC-AC-DC converters, or DC transformers. It also relates to the field of AC-AC converters.

One of the main objectives of DC-DC converter design is to reduce size and weight without adversely affecting other constraints. Compact designs require small parts, which implies low energy storage.

Simple unregulated square-wave DC transformers require minimal energy storage in their magnetic and capactive components, but they have two main disadvantages. Substantial electromagnetic interference can be created by the steep slope of the voltage waveforms and by spikes on the input current caused by overlap in the conduction of the switching devices. Normal variances between individual switches and rectifiers produce dissymmetry in the transformer voltages and currents, and can cause the transformer core to saturate.

All variable-ratio switching converters must store considerable energy in their magnetic and capacitive components. Integrated magnetics and coupled-inductor converters, as exemplified by the teachings of U.S. Pat. No. 4,274,133 to Cuk et al., are among the most compact variable-ratio designs. Even though these topologies save space by placing two or more inductors on a common magnetic core, fluxes produced by the input and output windings add, thus increasing the energy storage.

Resonant techniques have also been used in the prior art to reduce component size, but the amount of energy storage required to maintain oscillations is substantial. Conventional resonant circuits store energy during some parts of the cycle and release energy during other parts. Enough energy must be stored to maintain oscillation for the greatest anticipated load. In the case of a parallel-resonant tank, this means that the current which circulates between the resonant elements is typically greater than the current which flows through the load.

U.S. Pat. No. 4,630,005 to Clegg et al. describes a current-fed, parallel-resonant inverter circuit in which, as a matter of economy, a small inductor used to provide a constant base current is placed on a common magnetic core with the main input inductor. The constant base current is actually achieved by developing a constant voltage across a resistor.

In accordance with the present invention, the input and output inductors of a current-fed, parallel-resonant DC-DC converter are placed on a common magnetic core. This arrangement produces two advantageous and unexpected results. First, when the output current is passed through a separate winding on the input inductor, it essentially cancels the DC flux produced by the input current. This greatly reduces the need for energy storage in this component, thereby reducing its required size.

When used in the topologies of the present invention, the two coupled inductors form a structure which is hereinafter referred to as a complement transformer. Complement transformers, like ordinary transformers, operate with AC voltages, and need to store little energy. Unlike ordinary transformers, complement transformers operate with DC currents instead of AC currents, and are intended for ripple cancellation instead of being used for transferring power.

The main transformer in current-fed, parallel-resonant circuits is connected in parallel with one or more capacitances to form a tank circuit. The second beneficial result of placing the input and output inductors on a common core is that the symmetry of the resulting DC-DC converter produces a unique condition in which the tank can freely oscillate with a small resonant current, independent of whatever load currents are applied. The magnetizing inductance of the main transformer can therefore be made relatively large, and the parallel capacitance can be made relatively small, both resulting in minimal energy storage. This condition is hereinafter referred as complementary resonance.

An analysis of complementary resonance led to the discovery of a more general condition that is hereinafter referred to as complementary conversion. In complementary conversion topologies, the input current flows through a series connection of windings of the complement and main transformers, and the output current also flows through a similar set of series-connected windings. These series connections allow an AC voltage waveform of any desired shape to be impressed upon the main transformer without dissipating a significant amount of power. This property allows the tank to oscillate freely in complementary-resonant converters.

The present invention comprises several alternative, but related, complementary converter topologies in which the low ripple characteristic of integrated-magnetics converters and the efficient switching characteristics of zero-voltage-switching resonant converters are achieved, while requiring only the modest energy storage of square-wave converters.

DETAILED DESCRIPTION OF THE PREFERRED EMBODIMENTS

Complementary resonance is a simple way of defining the voltage waveform of the main transformer in a complementary converter. This type of converter has therefore been chosen to illustrate the principles of the present invention. Another simple, but less desirable, way of defining the main transformer voltage waveform is by way of a core saturation configuration. However, it is not practical to build high power converters of this configuration due to excessive power dissipation in the transformer core.

The basic complementary-resonant topologies described herein include center-tapped, half-bridge, and full-bridge topologies. A complementary converter includes at least one inverting section and one rectification section. Any combination of the basic topologies of inverting and rectification sections described herein may be used to construct a complementary converter. In addition, polyphase topologies are possible. The following description of the center-tapped configuration shown in FIG. 1 illustrates operating principles common to all complementary converters.

Figure 1:
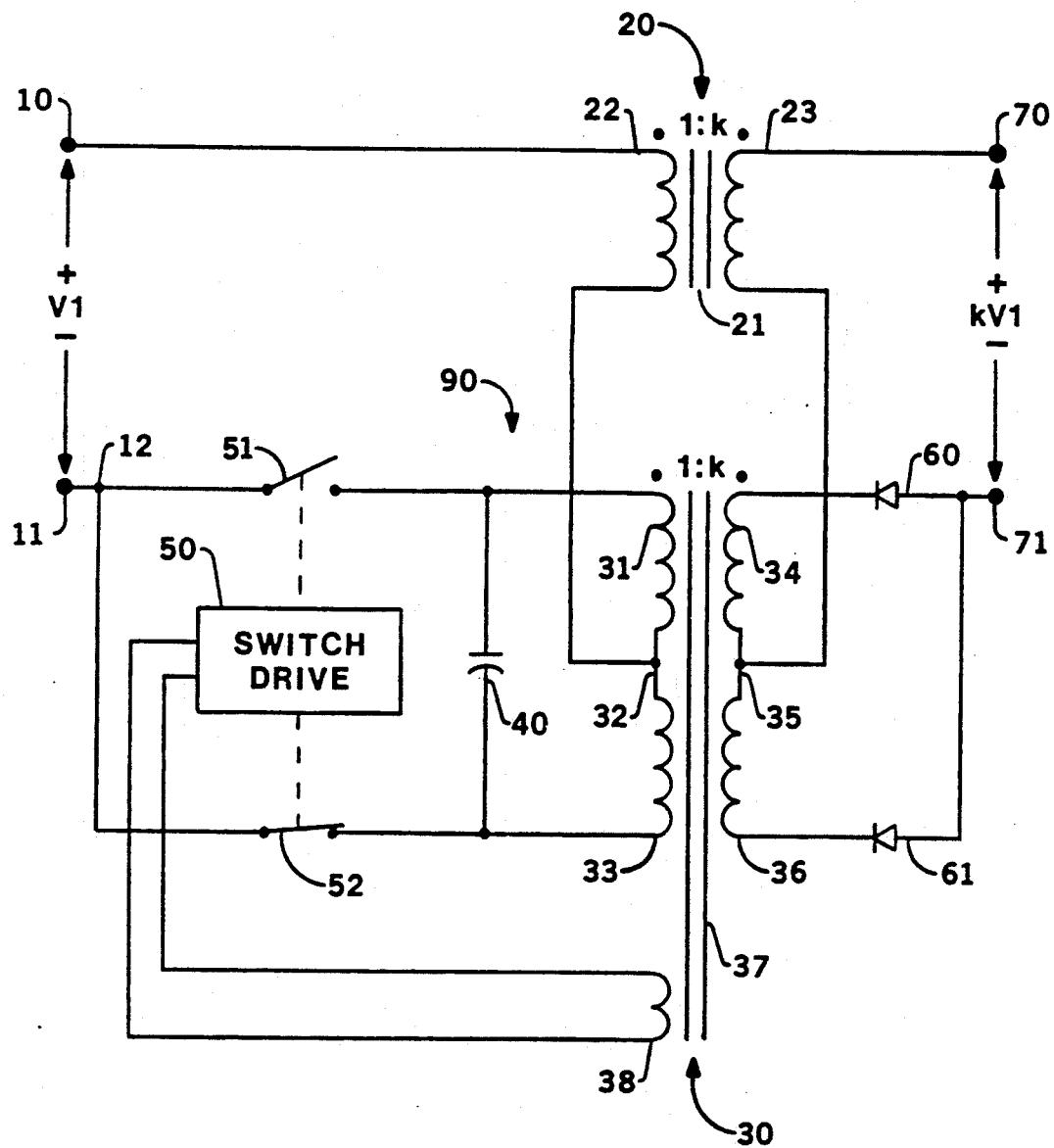
FIG. 1 is a schematic diagram of a complementary-resonant DC transformer, constructed in accordance with the present invention, in which center-tapped inverter and rectifier sections are provided.

Referring now in detail to the center-tapped configuration of FIG. 1, the input current flows from input terminal 10 to input terminal 11 through a number of elements connected in series. These include primary winding 22 of transformer 20, at least one of primary windings 31 and 33 of transformer 30, and at least one of switching devices 51 and 52. Switching devices 51, 52 may comprise any type of controlled switch, such as transistors or thyristors.

A capacitor 40 is connected in parallel with the series connection of windings 31 and 33 of main transformer 30 to form a resonant tank 90. Any capacitance connected in parallel with a switch in a complementary-resonant converter is effectively in parallel with the tank. Capacitor 40 could therefore be augmented or even replaced by capacitances placed in parallel with switches 51 and 52. Although not as obvious, capacitance from center-tap 32 to either of input terminals 10 or 11 also adds to the effective tank capacitance. Capacitances connected to the secondary windings of transformers 20 and 30 also add to the effective tank capacitance.

The voltage across windings 31 and 33 measured from switch 51 to switch 52 is referred to as the tank voltage. Switch drive 50 senses the tank voltage through feedback winding 38, and alternately changes the states of switches 51 and 52 each time the tank voltage passes through zero. Both switches 51, 52 are briefly on at the same time during the transition. The inductance of winding 22 prevents the switching overlap from causing spikes in the input current.

Switches 51 and 52 create sinusoidal oscillations by steering the input current through the tank in alternative directions whenever the tank voltage passes through zero. In general, each switch in a complementary converter is turned on when the voltage across it essentially drops to zero. The switch is turned off when the voltage across another switch reaches zero and is turned on. This switching sequence is illustrated by waveforms V2, V3, and V4 of FIG. 2. V2 represents the tank voltage, while V3 and V4 represent the voltages across switches 51 and 52, respectively. Zero-voltage switching ensures that the flux in the magnetic core of the main transformer 30 has an essentially zero average value even when the turn-off times of the switches 51, 52 are unequal.

In the single-phase complementary-resonant converters illustrated in FIGS. 1, 3, 4, and 5, the zero crossings of the switch voltage waveforms coincide with zero crossings of the tank voltages. In contrast, FIG. 7 illustrates that in polyphase configurations, such as the wye converter of FIG. 6, the switch voltages drop to zero when the difference between two tank voltages is zero.

Figure 2:
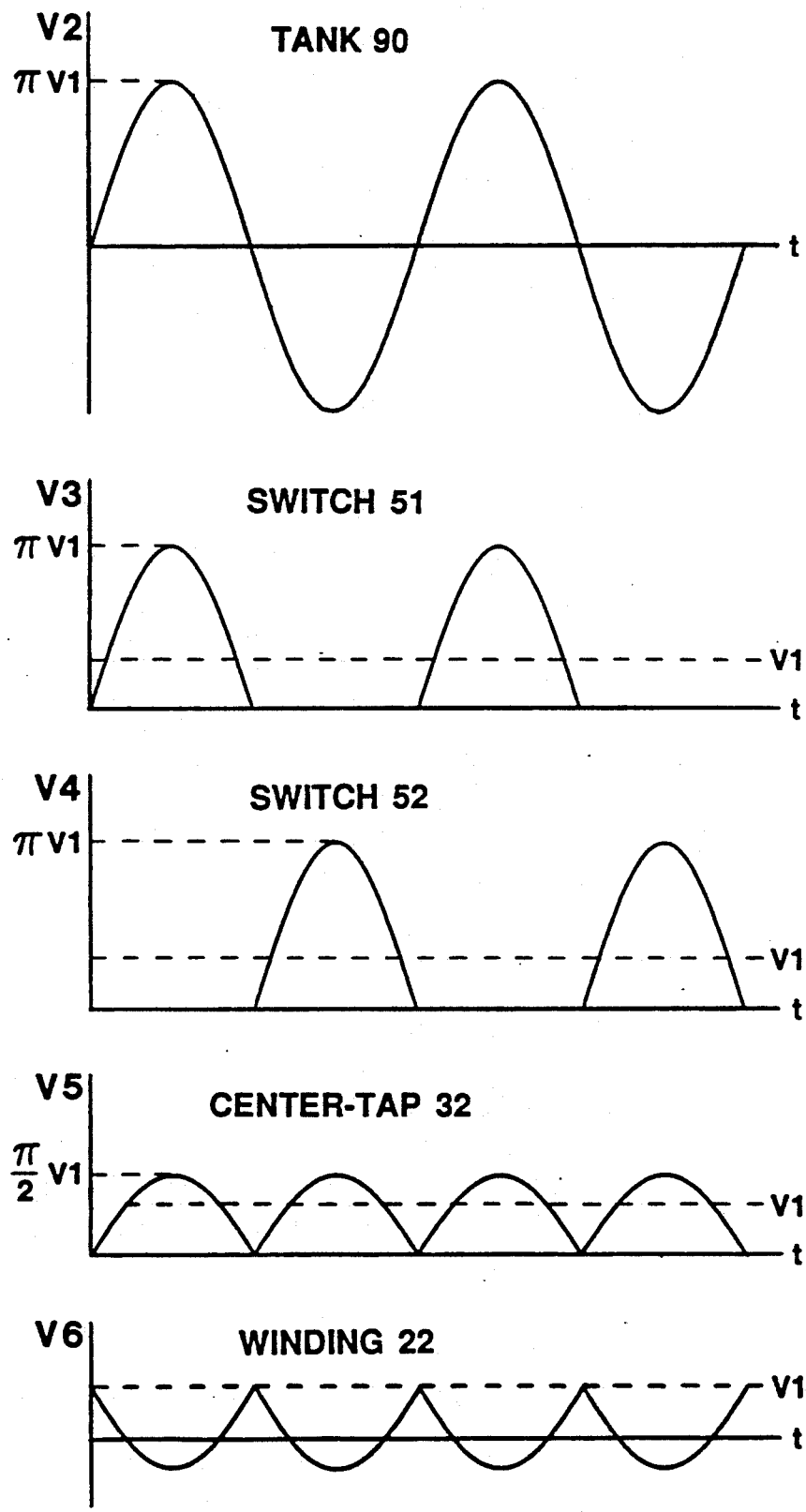
FIG. 2 illustrates a set of typical waveforms produced by the complementary-resonant DC transformer of FIG. 1.

Waveform V6 of FIG. 2 represents the voltage across winding 22, measured from input terminal 10 to center-tap 32, and waveform V5 represents the voltage from center-tap 32 to input terminal 11. Therefore, input voltage V1 must be divided between voltages V5 and V6. In other words, voltages V5 and V6 are complementary voltages, and transformer 20 is a complement transformer.

The input current of all complementary converters flows through a series connection of at least one of each of a number of elements. These elements include a primary winding of the main transformer, a primary winding of the complement transformer, and a switching device.

In a similar manner, the output current of all complementary converters flows through a series connection of at least one of each of a number of other elements. These elements include a secondary winding of the main transformer, a secondary winding of the complement transformer, and a conducting rectifying device. In FIG. 1, the output current flows from terminal 71 through either diode 60 and winding 34 or through diode 61 and winding 36. The current then flows from center-tap 35 through winding 23 to terminal 70.

The turns ratios of the transformers are adjusted so that, like the inverting section, the voltages of the series-connected winding of the rectifying section add to an essentially constant value. In the circuit of FIG. 1, both of the transformers have a 1:k turns ratio. Thus, the full-wave rectified voltage measured from center-tap 35 to terminal 71 is k times voltage V5, and the voltage across winding 23 is k times voltage V6. Consequently, the output voltage is k times voltage V1. Since the output voltage is ideally a constant times the input voltage, little filtering is required. In essence, the AC voltage of complement transformer winding 23 cancels the ripple, or AC component, of the rectified output of main transformer 30.

A unique property of complementary topologies is that, due to the series connections of the complement and main transformer windings, an AC voltage waveform may be impressed upon the main transformer without thereby dissipating much power, independent of the load current. In complementary-resonant topologies, this means that the energy entering the tank is essentially equal to the energy leaving it at every instant of time. The resonant waveform is therefore ideally sinusoidal, regardless of the level of load current. This allows the load current to exceed the resonant current. Consequently, capacitor 40 can be relatively small in value, and magnetic core 37 is not required to store much energy.

Magnetic core 21 also has minimal energy storage because the flux produced by the DC current in winding 22 is canceled by the DC current in winding 23. This is in marked contrast to the situation in prior art coupled-inductor circuits and integrated-magnetics circuits wherein the flux produced by the output windings adds to the flux produced by the input windings. The fact that the fluxes in the complement transformers cancel means that the core can produce a large magnetizing inductance while having small physical size. Having a large magnetizing inductance greatly reduces the input ripple current.

Because the voltage waveforms are ideally unaffected by the load current, the magnitudes of the ideal waveforms can be calculated by recalling that the average voltage across any transformer winding is zero, and that the peak voltage of a full-wave rectified sinusoid is pi/2 times its average value, while the peak of a half-wave rectified sinusoid is pi times its average value. Thus, the peak values of waveforms V2, V3, and V4 can be determined by recognizing that the average value of each of these waveforms is equal to voltage V1. Additionally, voltage V2 represents the difference between voltages V3 and V4, while voltage V5 represents the average of voltages V3 and V4. Voltage V6, of course, is voltage V1 minus voltage V5.

An examination of waveforms V5 and V6 is useful in analyzing the energy flow in complementary converters. Suppose that voltage VI is constant and has the polarity shown in FIG. 1. Also, assume that a constant load is connected between terminals 70 and 71. The energy transferred to the load through main transformer 30 varies sinusoidally, but the overall energy delivered to the load remains constant due to the action of complement transformer 20. Since the magnetizing inductance of transformer 20 is typically large, the current through winding 22 is nearly constant. When voltage V6 is positive, energy is delivered through transformer 20 to the load. At the same time, the energy delivered to the load by transformer 30 is less than its average value because the rectified voltage from tap 35 to terminal 71 (which has the same shape as waveform V5) is less than its average value. When this rectified voltage is greater than its average value, the energy transferred by transformer 30 is greater than its average value. To compensate for this, the excess energy flows back to the inverting section through transformer 20, because voltage V6 is negative at that time. Since the average value of voltage V6 is zero, the net energy transfer of complement transformer 20 is also zero.

It is often helpful to have some leakage inductance in the complement transformers to smooth out switching transients. This is done at the expense of increased energy storage because the flux cancellation is ideally proportional to the coupling between the primary and secondary windings.

The ripple current due to the finite magnetizing inductances of the complement transformer can be steered to either the input terminals or the output terminals by adjusting the turns ratios and leakage inductances of the complement transformer in the manner described in the patent to Cuk et al., cited above. In the present invention, however, the ripple current is already small since the flux cancellation in the complement transformer allows its magnetizing inductance to be quite large. Additional small inductors may be placed in series with the complement transformer windings to augment the leakage inductances.

The leakage inductance of the main transformer should be minimized since the current waveforms are ideally square. Matrix transformers, which are constructed with an array of cores, have particularly low leakage inductances and, thus, make excellent main transformers.

Each of the complementary converter configurations of the present invention may be modified without changing the basic properties of the converter, by changing the order of components which are connected in series. In FIG. 1, for example, center-tap 32 may be connected directly to input terminal 10 if winding 22 is connected between input terminal 11 and junction 12.

Another modification which retains the condition of complementary conversion is to replace the rectifiers with switches which are operated in synchronism with the input switches. This technique, called synchronous rectification, may be used to achieve a voltage drop which is smaller than is possible with diodes.

Synchronous rectification may also be used to obtain bidirectional power flow between two converter sections by allowing the inverting section to function also as a rectifying section, and by allowing a rectifying section to act also as an inverting section. If the main transformer has sufficient leakage inductance, it may be necessary to place some capacitance in parallel with the secondary windings.

If switches and driver circuits which are adapted to operate with any voltage polarity and any direction of current flow are employed, then changing the polarity of the input voltage would change the polarity of the output voltage. Complementary converters may thus be made to emulate an ideal transformer, passing both AC and DC voltages, so long as the frequency of the AC input voltage is small compared to the switching frequency of the converter.

The peak voltages of the sinusoidal waveforms across the switches and diodes in complementary-resonant converters are higher than they would be if the main transformer waveform were more square. The peak voltages can be reduced by operating the main transformer core near saturation, which causes the peaks to become more flattened. Non-linear capacitances and clipping techniques may also be used to shape the waveform.

In general, the main transformer voltage of complementary converters can be made to assume a specific waveform by connecting at least one winding of the main transformer to an oscillator which produces the desired waveform. The waveform produced by the oscillator must have an essentially zero average value, and it must have an amplitude which also allows the voltage across the complement transformer windings to have an essentially zero average value.

Figure 3:
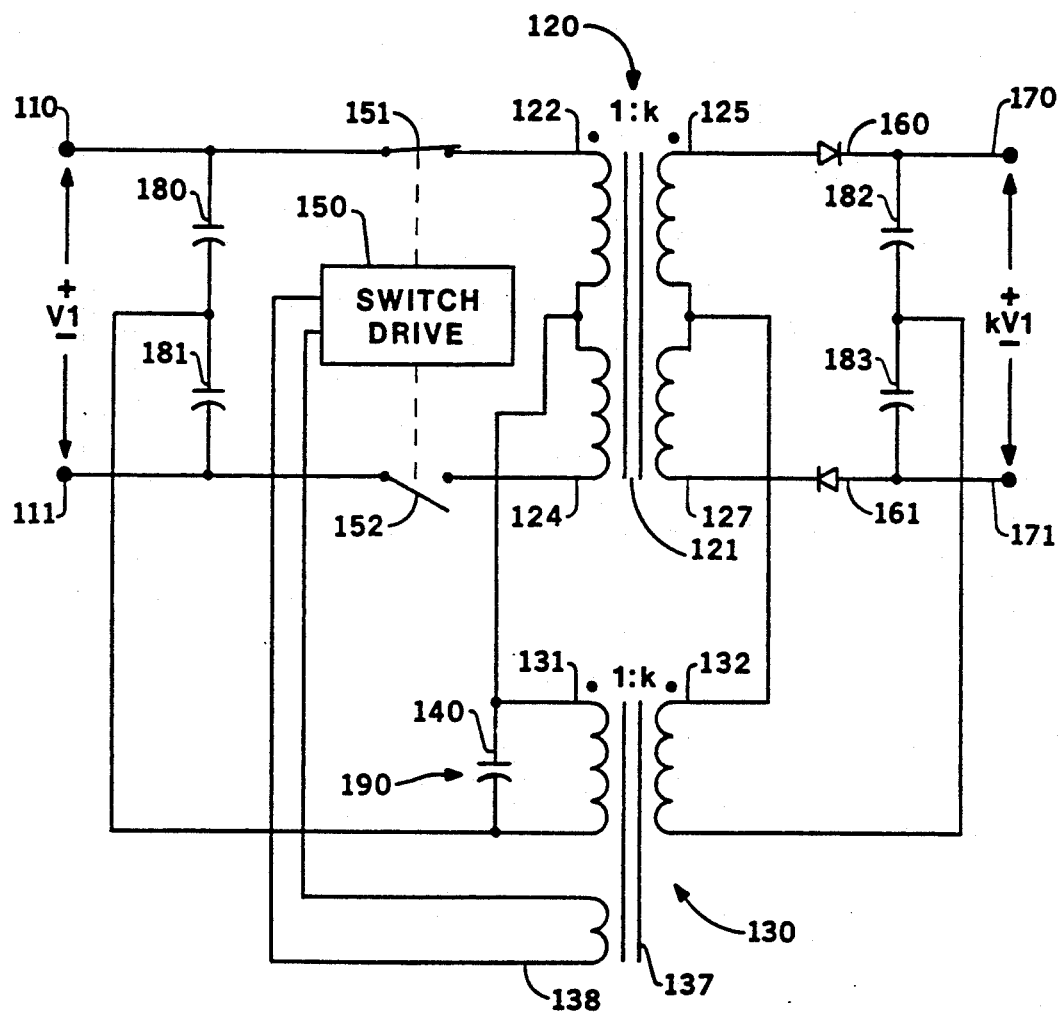
FIG. 3 is a schematic diagram of a complementary-resonant DC transformer, constructed in accordance with the present invention, having single-tank, half-bridge inverter and rectifier sections.

Referring now to FIG. 3, there is shown a complementary-resonant DC transformer having single-tank, half-bridge inverter and rectifier sections. This circuit uses a split complement transformer to produce alternating currents in a single tank winding.

Half-bridge configurations are useful because the peak voltage across the switches and diodes is only one-half of the peak voltage found in center-tapped configurations. The cost of obtaining lower voltages is that the current passing through the switches is double that of the center-tapped configuration.

Assuming that one ampere of current is flowing into input terminal 110, and that switches 151 and 152 are in the states shown in FIG. 3, two amperes would then flow through switch 151, winding 122 of complement transformer 120, and winding 131 of main transformer 130. If capacitors 180 and 181 have essentially equal capacitance, then the current flowing from winding 131 will split equally, with one ampere flowing out of terminal 111 and one ampere adding to the one ampere of input current passing through switch 151.

Capacitors 180 and 181 should be large enough so that the voltage change across them during one-half cycle is small compared to input voltage V1. The input ripple current is minimized when these capacitors have equal capacitance.

Capacitor 140 forms parallel-resonant tank 190 in combination with the inductance realized by winding 131 and magnetic core 137. The interwinding capacitance between windings 122 and 124 adds to the effective tank capacitance. If these windings are bifilar wound, the capacitance may be great enough to eliminate the need for capacitor 140.

When the sinusoidal voltage across winding 138 passes through zero, switch drive 150 changes switches 151 and 152 to the opposite states. Switch 152 will then direct current through tank 190 in the opposite direction than before. The current in windings 125 and 127 essentially cancels the DC flux in magnetic core 121 produced by windings 122 and 124.

The waveforms of the circuit of FIG. 3 have the same shape as the waveforms shown in FIG. 2, but the amplitudes are different. The peak switch voltages are pi/2 times voltage V1, and the peak voltage across winding 131 is pi/4 times voltage V1. The peak-to-peak voltages across each of windings 122 and 124 is pi/4 times voltage V1.

The rectification section operates similarly to the inverting section, with currents flowing alternately through winding 125 and diode 160 or through winding 127 and diode 161. Transformers 120 and 130 have a primary-to-secondary turns ratio of 1:k. Thus, when rectified, the sinusoidal voltage across winding 132 and the waveform of transformer 120 add to form a nearly constant output voltage of k times voltage V1 between terminals 170 and 171. The output ripple voltage is inversely related to the values of capacitors 180-183, and is minimized when capacitors 182 and 183 are equal. An alternative configuration having equivalent waveforms places switches 151 and 152 between windings 122 and 124.

Figure 4:
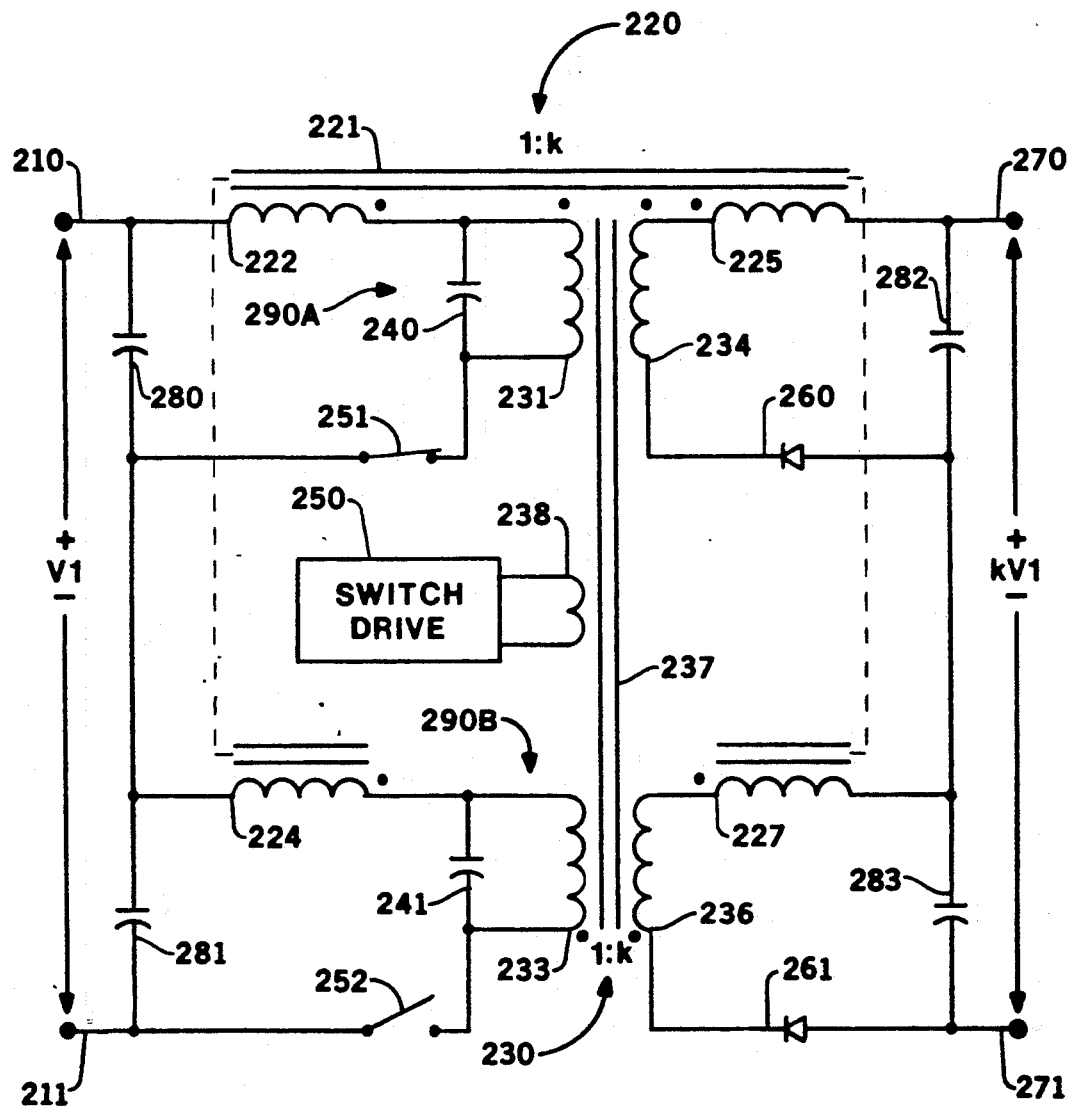
FIG. 4 is a schematic diagram of a complementary-resonant DC transformer, constructed in accordance with the present invention, having split-tank, half-bridge inverter and rectifier sections.

Referring now to FIG. 4, there is shown a complementary-resonant DC transformer having split-tank, half-bridge inverter and rectifier sections. The tank comprises two sections coupled by magnetic core 237. Capacitor 240 and winding 231 of main transformer 230 form tank section 290A, and capacitor 241 and winding 233 form tank section 290B.

This circuit has properties very similar to those of the circuit of FIG. 3. Assuming that one ampere of current is flowing into input terminal 210, and that switches 251 and 252 are in the states shown, two amperes would then flow through winding 222 of complement transformer 220 and tank section 290A. If capacitors 280 and 281 have essentially equal capacitance, then the current flowing through tank section 290A will split equally, with one ampere flowing out of terminal 211 and one ampere adding to the one ampere of input current passing through switch 251.

Capacitors 280 and 281 should be large enough so that the voltage change across them during one-half cycle is small compared to input voltage V1. The input ripple current is minimized when these capacitors have equal capacitance.

When the sinusoidal voltage across winding 238 passes through zero, switch drive 250 changes switches 251 and 252 to the opposite states. Switch 252 will then direct current through tank section 290B and winding 224.

The waveforms of the circuit of FIG. 4 have the same shape and amplitude as those generated by the circuit of FIG. 3. The peak switch voltages are pi/2 times voltage V1, and the peak voltage across windings 231 and 233 are each pi/4 times voltage V1. The peak-to-peak voltages across each of windings 222 and 224 is pi/4 times voltage V1.

The rectification section operates similarly to the inverting section, with currents flowing alternately through diode 260 and windings 234 and 225, or through windings 227 and 236 and diode 261. The primary-to-secondary turns ratios of transformers 220 and 230 are 1:k. The rectified outputs of transformers 220 and 230 therefore add to form a nearly constant output voltage of k time voltage V1 between terminals 270 and 271. The output ripple voltage is inversely related to the capacitance of capacitors 280-283, and is minimized when capacitors 282 and 283 have equal capacitance. Other configurations having equivalent waveforms are obtained by changing the order in which the transformer windings and switches are connected.

Figure 5:
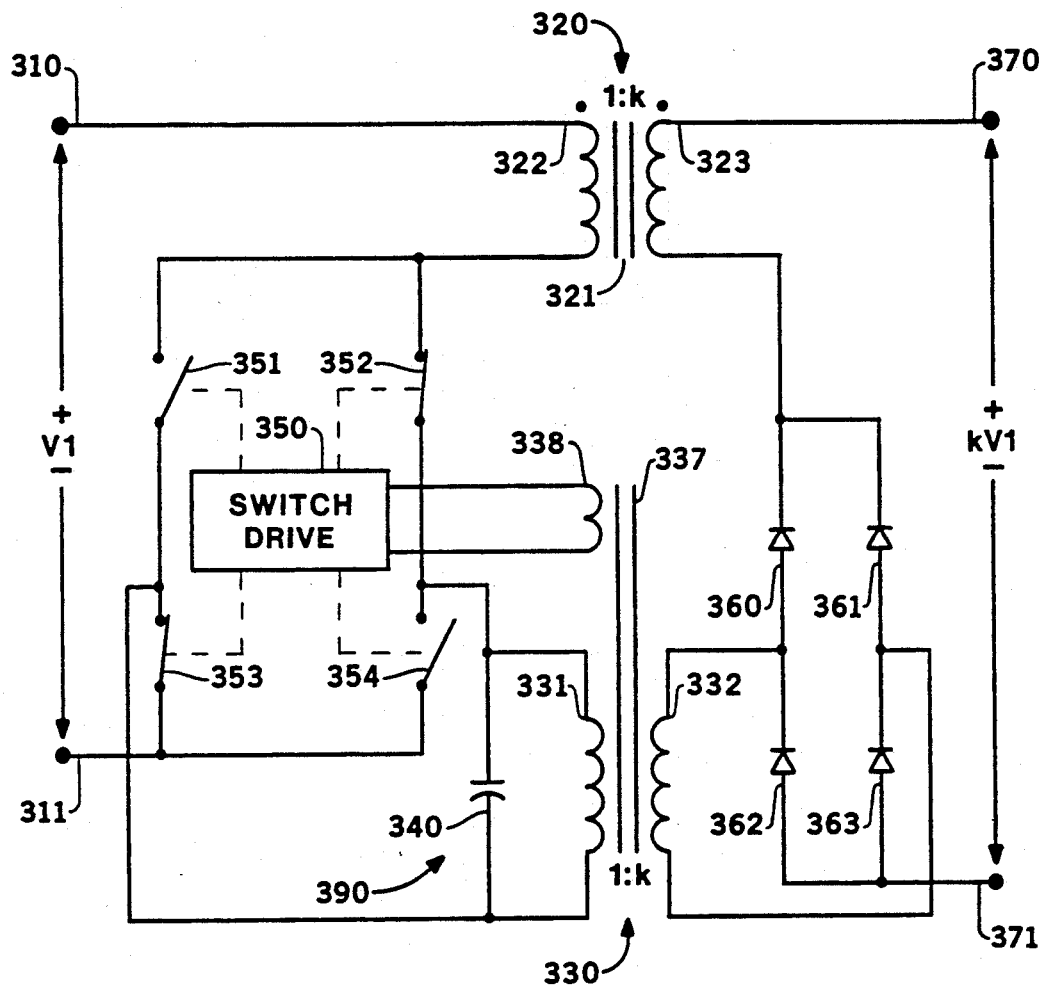
FIG. 5 is a schematic diagram of a complementary-resonant DC transformer, constructed in accordance with the present invention, having full-bridge inverter and rectifier sections.

Referring now to FIG. 5, there is shown a complementary-resonant DC transformer having full-bridge inverter and rectifier sections. The peak voltages across the switches and diodes in full-bridge configurations are only one-half of the voltages applied to their counterparts in center-tapped configurations. However, unlike half-bridge configurations, the current flowing through the switches is the same as the input current.

Voltage V1 across input terminals 310 and 311 is divided between winding 322 of complement transformer 320 and winding 331 of main transformer 330. Capacitor 340, in combination with the inductance presented by winding 331 and magnetic core 337, form resonant tank 390. When the sinusoidal voltage across winding 338 passes through zero, switch drive 350 changes the states of switches 351-354. Switches 352 and 353 are on while switches 351 and 354 are off and vice versa.

Transformers 320 and 330 each have a primary-to-secondary turns ratio of 1:k. The voltage between output terminals 370 and 371 is equal to k times voltage V1, and is split between windings 323 and 332. The four diodes 360-363 provide full-wave rectification of the sinusoidal voltage across winding 332. Winding 323 cancels the ripple in the rectified voltage and also cancels the DC flux in magnetic core 321.

The waveforms generated by the circuit of FIG. 5 have the same shape as those shown in FIG. 2, but the amplitudes are different. The peak switch voltages and the peak voltage across winding 331 are each pi/2 times voltage V1. The peak-to-peak voltage across winding 322 is also pi/2 times voltage V1.

Figure 6:
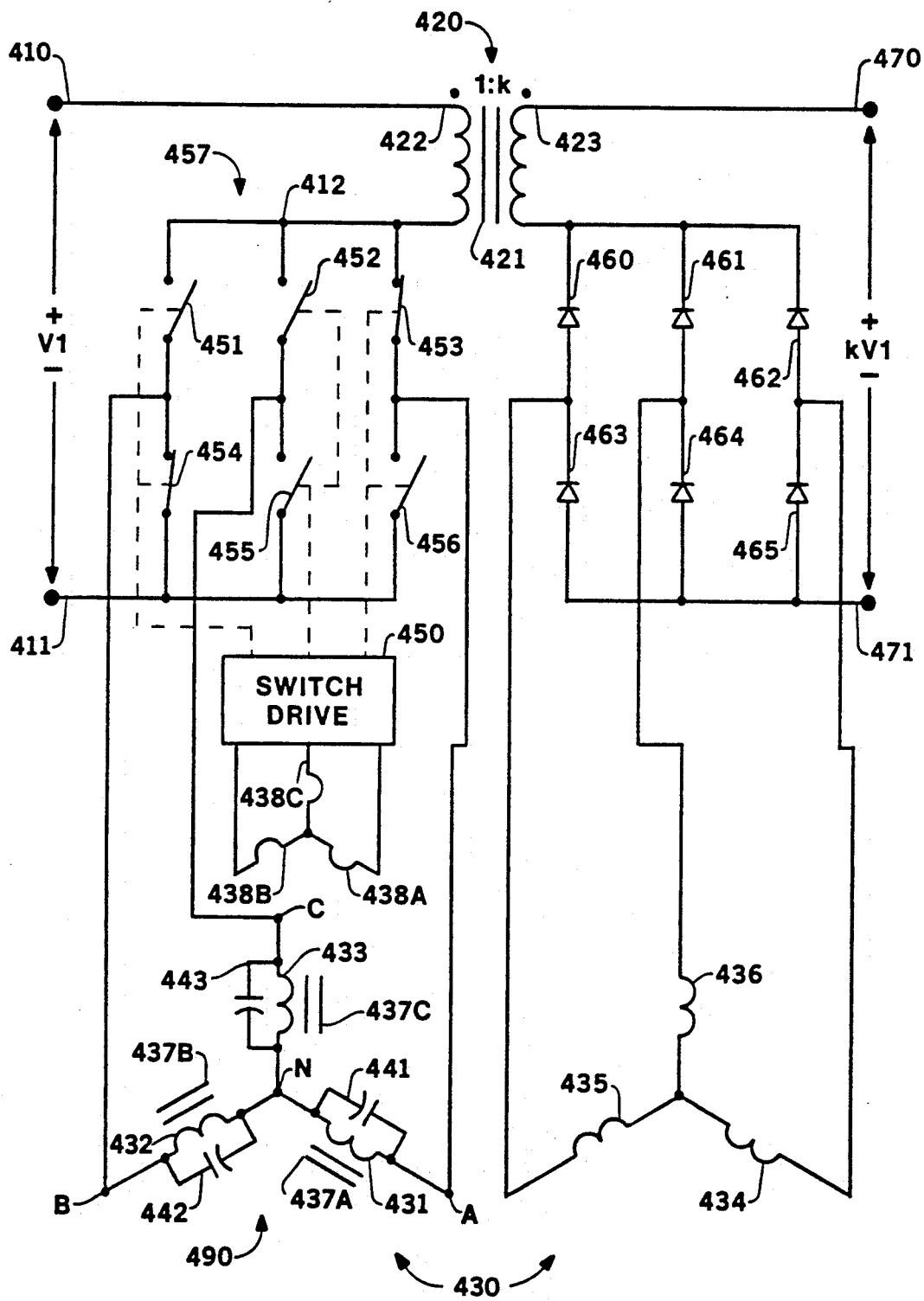
FIG. 6 is a schematic diagram of a complementary-resonant DC transformer, constructed in accordance with the present invention, having three-phase wye inverter and rectifier sections.
Figure 7:
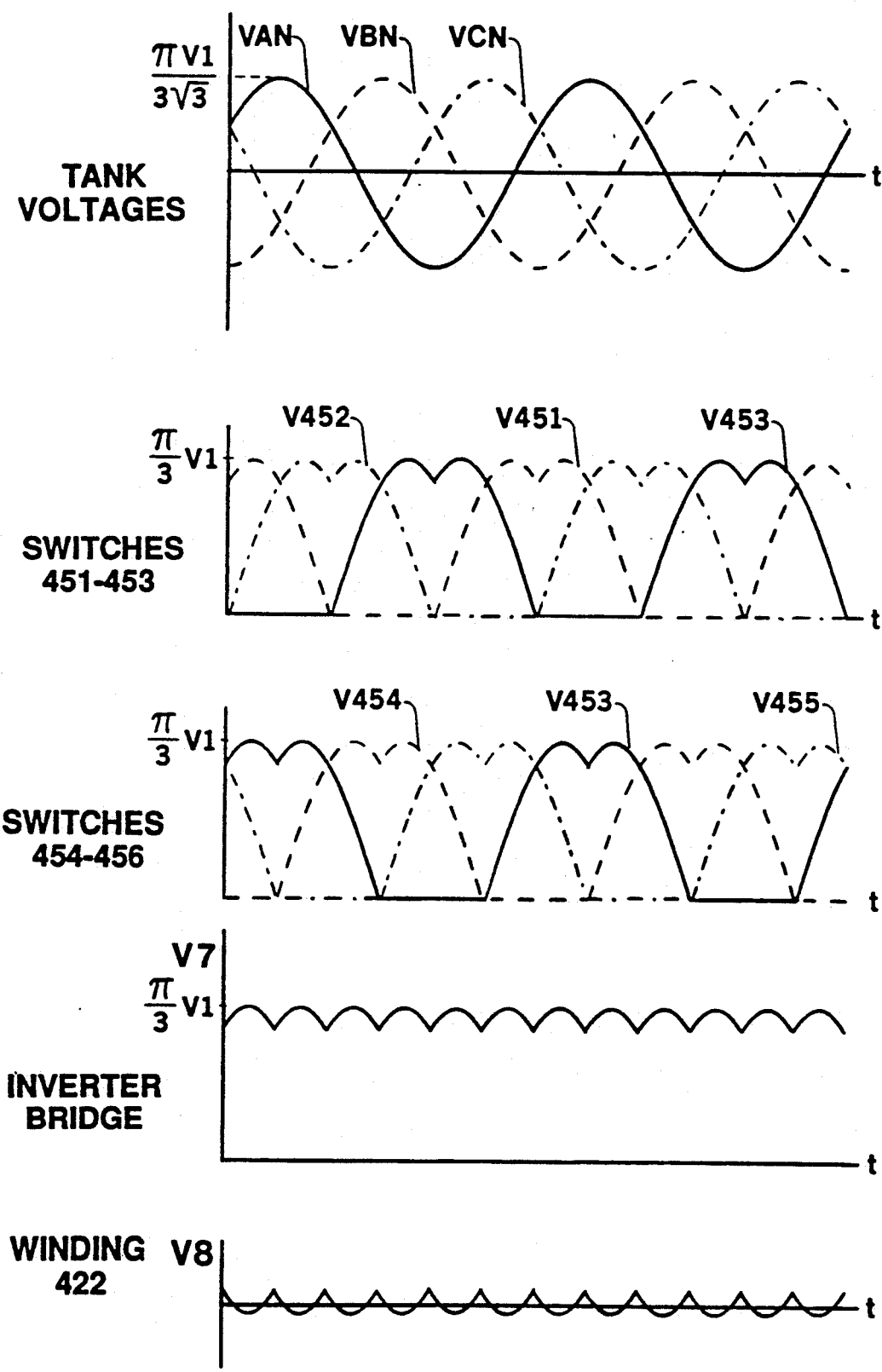
FIG. 7 illustrates a typical set of waveforms produced by the complementary-resonant DC transformer of FIG. 6.

Referring now to the circuit of FIG. 6, there is shown a complementary-resonant DC transformer having three-phase wye inverter and rectifier sections. Polyphase configurations are particularly useful for high-power applications. They also have the advantage of producing lower peak voltages across the switches and rectifiers. In the circuit of FIG. 6, the peak switch voltages are only pi/3 times the DC input voltage.

Any polyphase rectifier circuit can serve as the basis for a complementary converter. The complementary transformer fills the positions normally occupied by a filter choke. The inverting and rectifying sections can be based on different topologies so long as the waveforms on the primary and secondary windings of the complement transformer do not conflict. A main transformer with a wye-connected primary winding, for example, is compatible with a star-connected secondary winding but not with a delta-connected secondary winding.

In the circuit of FIG. 6, voltage V1 between input terminals 410 and 411 is divided between winding 422 of complement transformer 420 and two of windings 431–433 of main transformer assembly 430. The main transformer windings, along with magnetic cores 437A–437C, may be constructed as separate transformers or as part of a single structure. Capacitors 441–443 are connected in parallel with windings 431–433, respectively, to form three-phase resonant tank 490.

Switches 451–456 are connected to form an inverter bridge 457. They determine which two windings are being driven and the direction of current flow. Switch drive 450 is synchronized to the tank through windings 438A–438C.

FIG. 7 illustrates the switching sequence for an ABC phase sequence. Waveforms VAN, VBN, and VCN represent the respective voltages between points A, B, and C and point N. Each switch is turned on when the voltage across it drops to zero. For the circuit of FIG. 6, this occurs when the voltages across two of windings 431–433 have equal values. Each switch is turned off later in the resonant cycle when another switch is turned on. For example, switch 453 is turned on when voltage VAN equals voltage VCN. It is turned off when voltage VAN equals voltage VBN, and switch 451 is turned on. Switch 454 is on at the start of the waveforms, and switch 453 has just closed. Voltage V7 is the voltage across inverter bridge 457, measured from junction 412 to terminal 411. Voltage V8 is the voltage across winding 422, measured from terminal 410 to junction 412. Assuming ideal switches, the sum of voltage V7 and voltage V8 is equal to input voltage V1.

Secondary windings 434–436 have k times as many turns as windings 431–433. The voltage across winding 423 cancels the ripple in the voltage rectified by diodes 460–465. Thus, the voltage between terminals 470 and 471 is k times voltage V1. The flux produced in magnetic core 421 by the DC current in winding 422 is essentially canceled by the flux produced by the DC current flowing in winding 423.

I claim:

1. An electronic power converter for receiving an input voltage and for generating a proportional output voltage therefrom, the electronic power converter comprising:
   an inverting circuit, first and second transformer means, and one or more rectifying circuits;
   said inverting circuit being magnetically coupled by said first and second transformer means to said one or more rectifying circuits.,
   said first and second transformer means each comprising at least one primary winding, at least one secondary winding, and magnetic core means;
   said inverting circuit comprising oscillator means adapted to produce one or more phases of oscillations of a predetermined waveform having a substantially zero average value and being coupled to at least one winding of said second transformer means;
   said inverting circuit further comprising a plurality of switching means and switch control means connected to each of said switching means and synchronized with the oscillations produced by said oscillator means for causing each of said switching means to become conductive when a voltage across said switching means diminishes to substantially zero, and for causing each of said switching means to become non-conductive when a different one of said switching means becomes conductive;
   said at least one primary winding of said first transformer means, said at least one primary winding of said second transformer means, and at least one of said plurality of switching means being connected in series to provide a path for an input current;
   each one of said one or more rectifying circuits comprising a plurality of rectifier elements;
   said at least one secondary winding of said first transformer means, said at least one secondary winding of said second transformer means, and at least one of said plurality of rectifier elements being connected in series to provide a path for an output current;
   said first and second transformer means having turns ratios between the primary and secondary windings thereof that are selected such that a flux in said magnetic core means of said first transformer means, produced by said input current, excluding a ripple component thereof, is substantially canceled by a flux in said magnetic core means of said first transformer means produced by said output current.

2. An electronic power converter for receiving an input voltage and for generating a proportional output voltage therefrom, the electronic power converter comprising:
   an inverting circuit adapted to produce one or more phases of essentially sinusoidal oscillations, first and second transformer means, and one or more rectifying circuits;
   said inverting circuit being magnetically coupled by said first and second transformer means to said one or more rectifying circuits;
   said first and second transformer means each comprising at least one primary winding, at least one secondary winding, and magnetic core means;
   said inverting circuit comprising a plurality of switching means and switch control means connected to each of said switching means and synchronized with said essentially sinusoidal oscillations for causing each of said switching means to become conductive when a voltage across said switching means diminishes to substantially zero volts, and for causing each switching means to become non-conductive when a different one of said switching means becomes conductive;
   said inverting circuit further comprising one or more capacitance means effectively connected in parallel with said at least one winding of said second transformer means, thereby forming one or more parallel-resonant tank circuits capable of sustaining one or more phases of essentially sinusoidal oscillations;
   said at least one primary winding of said first transformer means, said at least one primary winding of said second transformer means, and at least one of said plurality of switching means being connected in series to provide a path for an input current;
   each one of said one or more rectifying circuits comprising a plurality of rectifier elements;
   said at least one secondary winding of said first transformer means, said at least one secondary winding of said second transformer means, and at least one of said plurality of said rectifier elements being connected in series to provide a path for an output current;

said first and second transformer means having turns ratios between the primary and secondary windings thereof that are selected such that a flux in said magnetic core means of said first transformer means, produced by said input current, excluding a ripple component thereof, is substantially canceled by a flux in said magnetic core means of said first transformer means produced by said output current.

3. An electronic power converter for receiving an input voltage and for generating a proportional output voltage therefrom, the electronic power converter comprising:

an inverting circuit adapted to produce one or more phases of oscillations, first and second transformer means, and one or more rectifying circuits;

said inverting circuit being magnetically coupled by said first and second transformer means to said one or more rectifying circuits;

said first and second transformer means each comprising at least one primary winding, at least one secondary winding, and magnetic core means;

said inverting circuit comprising a plurality of switching means and switch control means connected to each of said switching means and synchronized with said oscillations for causing each of said switching means to become conductive when a voltage across said switching means diminishes to substantially zero volts, and for causing each switching means to become non-conductive when a different one of said switching means becomes conductive;

said inverting circuit further comprising one or more capacitance means effectively connected in parallel with said at least one winding of said second transformer means, thereby forming one or more parallel-resonant tank circuits capable of sustaining one or more phases of oscillations;

said inverting circuit further comprising waveshaping means coupled to said one or more parallel-resonant tank circuits, thereby altering an inherently sinusoidal waveshape of said oscillations;

said at least one primary winding of said first transformer means, said at least one primary winding of said second transformer means, and at least one of said plurality of switching means being connected in series to provide a path for an input current;

each one of said one or more rectifying circuits comprising a plurality of rectifier elements;

said at least one secondary winding of said first transformer means, said at least one secondary winding of said second transformer means, and at least one of said plurality of said rectifier elements being connected in series to provide a path for an output current;

said first and second transformer means having turns ratios between the primary and secondary windings thereof that are selected such that a flux in said magnetic core means of said first transformer means, produced by said input current, excluding a ripple component thereof, is substantially canceled by a flux in said magnetic core means of said first transformer means produced by said output current.

4. An electronic power converter as in claim 1 wherein at least one of said one or more rectifying elements comprises synchronous rectification means.

5. An electronic power converter as in claim 2 wherein at least one of said one or more rectifying elements comprises synchronous rectification means.

6. An electronic power converter as in claim 3 wherein at least one of said one or more rectifying elements comprises synchronous rectification means.

7. An electronic power converter as in claim 1 wherein two or more of said plurality of switching means and two or more of said one or more rectifying elements comprises synchronous rectification means, thereby providing bidirectional power flow by enabling said inverting circuit to operate as a rectifying circuit and by enabling at least one of said one or more rectifying circuits to operate as an inverting circuit.

8. An electronic power converter as in claim 2 wherein two or more of said plurality of switching means and two or more of said one or more rectifying elements comprises synchronous rectification means, thereby providing bidirectional power flow by enabling said inverting circuit to operate as a rectifying circuit and by enabling at least one of said one or more rectifying circuits to operate as an inverting circuit.

9. An electronic power converter as in claim 3 wherein two or more of said plurality of switching means and two or more of said one or more rectifying elements comprises synchronous rectification means, thereby providing bidirectional power flow by enabling said inverting circuit to operate as a rectifying circuit and by enabling at least one of said one or more rectifying circuits to operate as an inverting circuit.

* * * * *